July 7, 1931.  J. J. VARUSKY  1,813,519
GRAIN FEEDING DEVICE
Filed April 10, 1929  3 Sheets-Sheet 1
Fig. I
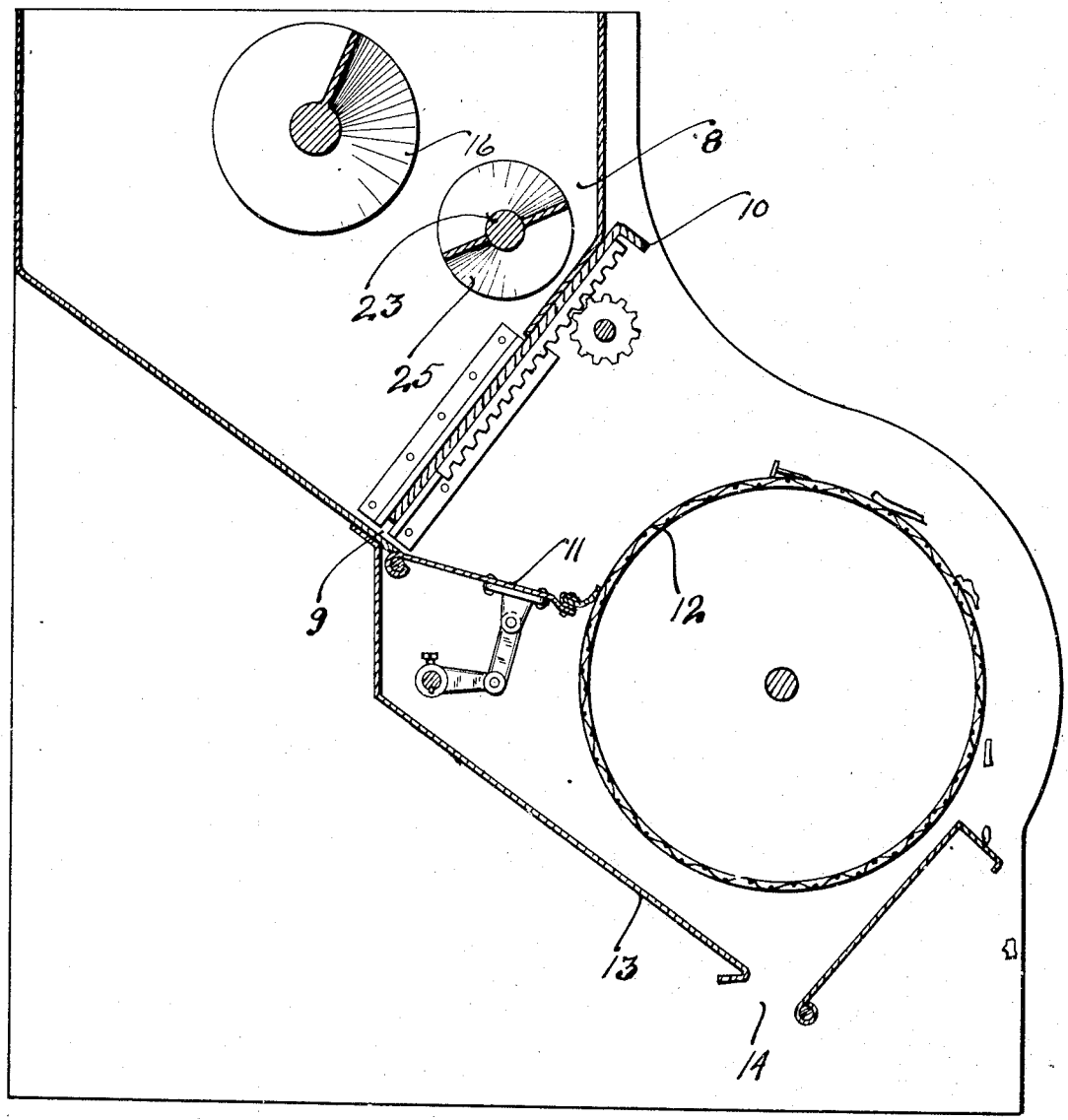
Inventor
John J Varusky
By his Attorneys July 7, 1931. J. J. VARUSKY 1,813,519
GRAIN FEEDING DEVICE
Filed April 10, 1929 3 Sheets-Sheet 2
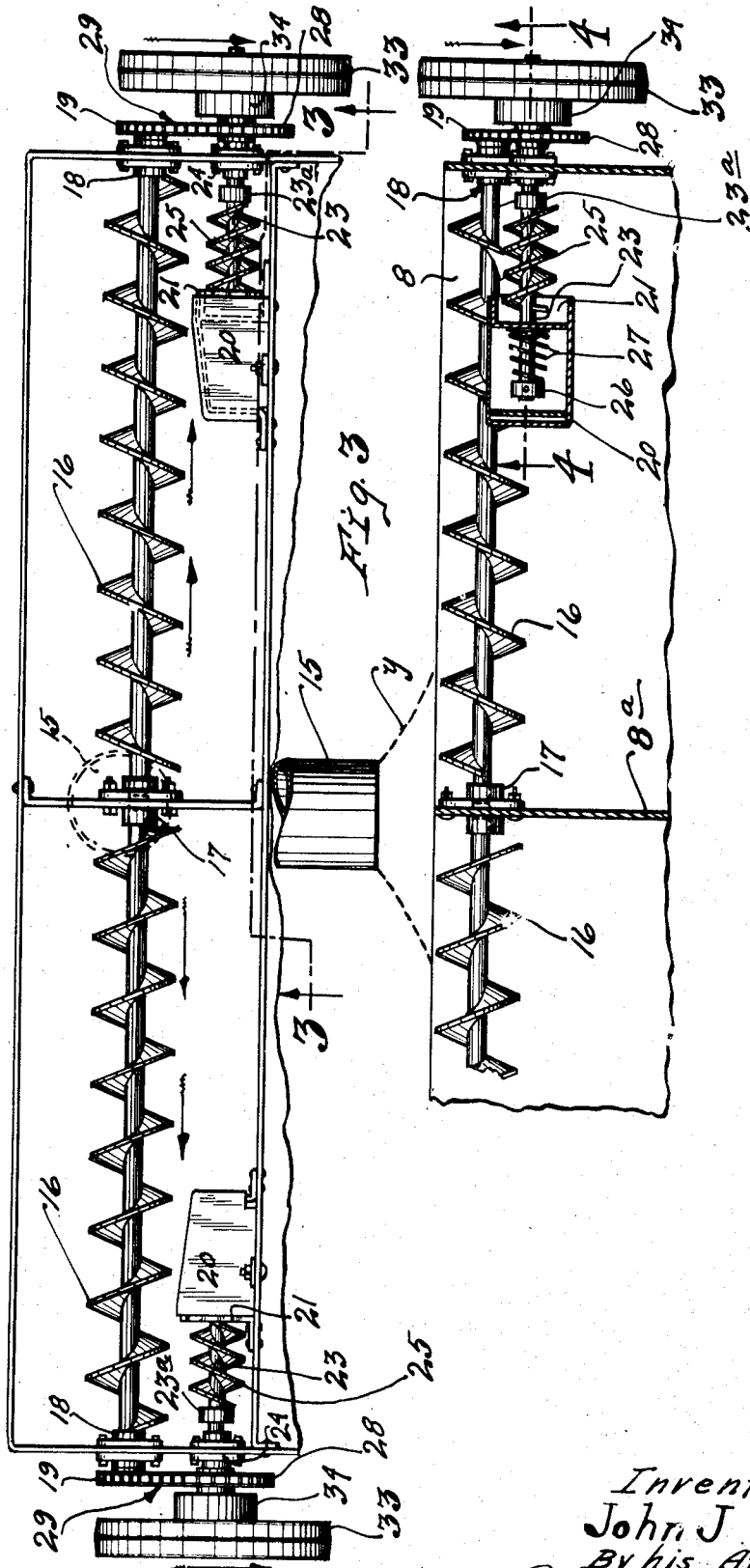
Inventor
John J. Varusky
By his Attorneys July 7, 1931. J. J. VARUSKY 1,813,519
GRAIN FEEDING DEVICE
Filed April 10, 1929 3 Sheets-Sheet 3
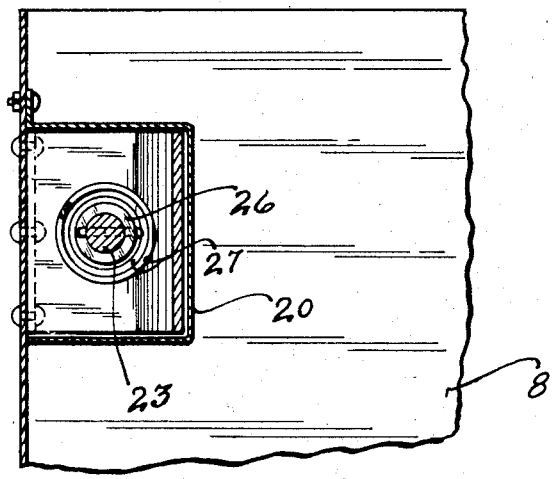
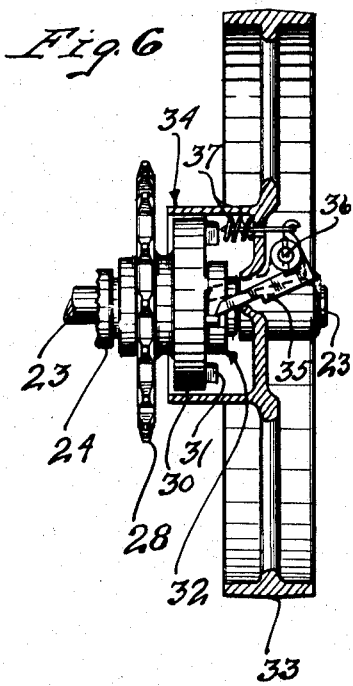
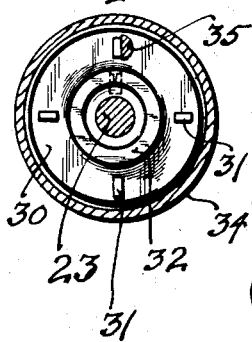
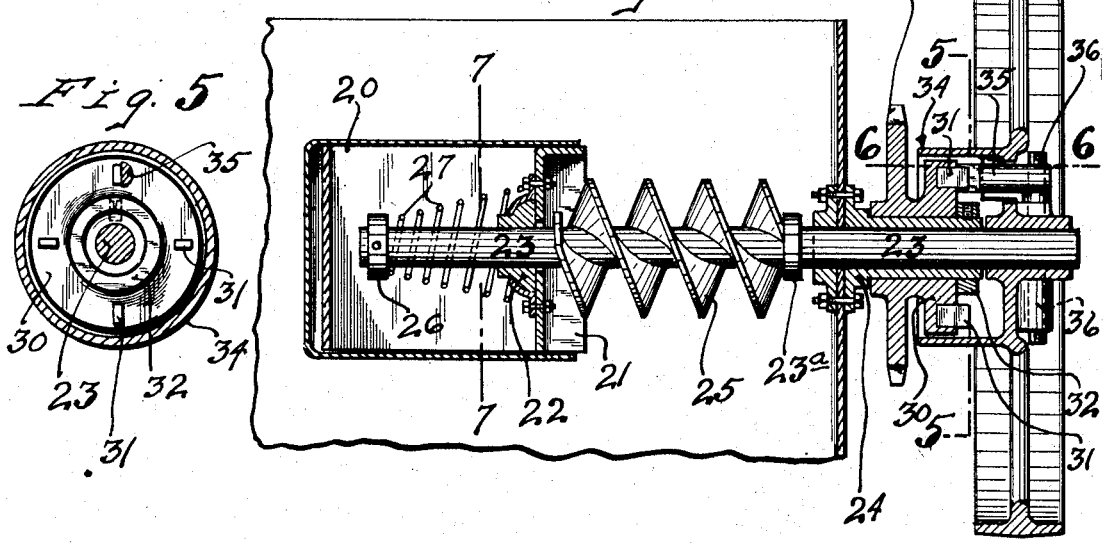
Inventor
John J Varusky
By his Attorneys
Michael Kilgore Patented July 7, 1931

1,813,519

UNITED STATES PATENT OFFICE

JOHN J. VARUSKY, OF MINNEAPOLIS, MINNESOTA, ASSIGNOR TO HART-CARTER COMPANY, OF PEORIA, ILLINOIS, A CORPORATION OF DELAWARE

GRAIN FEEDING DEVICE

Application filed April 10, 1929. Serial No. 353,989.

My present invention provides an extremely simple and highly efficient feeding mechanism or device especially adapted for use in feeding grain to scalpers, separators and the like, where it is important that the grain be discharged or delivered in a widely spread out comparatively thin sheet of even depth or thickness.

Generally stated, the invention consists of the novel devices, combinations of devices and arrangement of parts hereinafter described and defined in the claims. The device is capable of various modifications as to construction and arrangement of parts, but is preferably of the construction and arrangement disclosed in the accompanying drawings which illustrate a commercial form of the device.

Referring to the drawings wherein like characters indicate like parts throughout the several views:—

Fig. 1 is a vertical section taken from front to rear through a machine involving the improved feed device and showing the same arranged to deliver to a scalper of the rotary type;

Fig. 2 is a plan view showing the feed mechanism of the machine illustrated in Fig. 1, some parts being broken away and some parts removed;

Fig. 3 is a fragmentary vertical section taken approximately on the line 3—3 of Fig. 2;

Fig. 4 is a vertical section taken on the line 4—4 of Fig. 3;

Fig. 5 is a detail in section on the line 5—5 of Fig. 4;

Fig. 6 is a detail showing the driving pulley, driving clutch and immediately associated parts, some parts being sectioned on the line 6—6 of Fig. 4; and Fig. 7 is a transverse section taken on the line 7—7 of Fig. 4, some parts being broken away.

In the drawings, I have shown my invention as applied to a hopper-like grain receptacle 8 having in its bottom an elongated discharge passage 9 arranged to be opened and closed to a greater or less extent by an adjustable discharge gate 10 and to deliver over a deck 11 to a horizontally disposed rotary scalping screen 12. The hopper and scalper structure just noted and herein completely shown may be assumed to be of the type disclosed and claimed in the prior Carter Patent No. 1,620,439, issued March 8, 1927 and entitled "Scalpers". In this arrangement, in the separation of scalpings, to wit: large foreign material from commingled wheat and oats and the like, the commingled grain will be discharged through the rotary screen 12 to a hopper 13 having a discharge passage 14, while the scalpings will be carried over by the rotary screen and delivered outside of said hopper 13. This Carter scalper is a good illustration of the type of device which, for efficient action, requires the delivery of the grain in a widely spread out comparatively thin sheet of even depth or thickness, but, as above indicated, there are many other machines or devices that require a delivery of the character above indicated.

In the arrangement illustrated, the grain will be delivered to the feed hopper or receptacle 8, under the action of gravity, from a supply spout 15 that is terminated so close to the top of the hopper that the grain running therefrom and spreading out within the hopper will not run under the action of gravity from the place of delivery to the most remote point of the hopper. The angle of repose, that is, the lines on which the grain will run from the spout 15 into the feed hopper 8 are indicated substantially by the dotted lines marked $y$ on Fig. 3.

In the drawings, I have illustrated a duplex arrangement of spreading and feeding means and hence the feed hopper 8 is shown as divided at its center by a partition 8ª, although even with this duplex arrangement, complete separation of the two parts of the hopper is not essential. The arrangement of mechanism in both halves of the hopper are alike, except that they are arranged for reverse actions to spread and feed the grain from the center of the complete hopper or from the inner ends of the divided or individual hoppers, and hence the description of one of said feeding devices together with its clutch-driving and clutch-controlling mechanism will suffice for the description of both.

As a primary grain spreading means, I provide a feed screw or spiral conveyor 16, the shaft of which is journaled at its inner end in a bearing 17 applied to the partition 8ᵃ (in fact, the inner ends of both spiral conveyor shafts, as shown, are journaled in the same bearing 17) while the outer end of the shaft of said conveyor is extended through and journaled in a bearing 18 applied on the outer end of the hopper. The projecting outer end of the shaft of the conveyor 16, as shown, is provided with a sprocket 19. Suitably secured to one side of the hopper 8 is a small box-like housing 20 provided in its outturned end with a closely fitting fixed head 21 on which is a shaft bearing 22.

Extended parallel to but spaced laterally from the conveyor 16 is a relatively short shaft 23 that is journaled in and movable endwise through the bearing 22 and through a bearing 24 applied on the outer end of the hopper 8. Between the head 21 and the outer end of the hopper 8, shaft 23 is provided with a spiral conveyor or feed screw 25 and at its extreme inner end it is provided with a collar 26 between which and the bearing 22 of the head 21 a coiled compression spring 27 is applied.

The bearing 24 is provided with an outwardly projecting sleeve on which is journaled a driving sprocket 28 over which and the sprocket 19 on the shaft of conveyor 16 runs a sprocket chain 29. Sprocket 28 on its hub carries a half clutch member 30 shown as provided with circumferentially spaced laterally projecting lugs 31. Sprocket 28 and its half clutch 30 are held against axial movement on the sleeve of bearing 24 by a stop collar 32 secured on the outer end of said sleeve. To the extreme outer end of shaft 23 is secured a driving member which, in this particular structure, is in the form of a pulley 33 equipped with a cylindrical hub flange 34 that encloses the chief parts of the clutch mechanism. The hub portion of this sprocket 28 is utilized as the carrier of the driving half clutch member and while this clutch mechanism may take various forms, it is preferably of the type illustrated, wherein the pulley 33 is provided with one or more driving dogs 35 pivoted to the hub of said pulley at offset points 36 so that said dog, upon an initial engagement with one of the lugs 31, of the half clutch member 30, will be driven into full engagement, thus preventing clicking or slipping action between the two clutch members. As best shown in Fig. 6, the extreme oscillatory movement of the dog 35 is limited by the size of an opening formed therefor in the flange of the pulley and said dog is yieldingly held in a retracted position shown in Fig. 6, by a spring connection 37 between said dog and the pulley. Obviously, upon release of the clutch members, dog 35 will assume a complete released position to avoid clicking action.

*Operation*

The normal tension of spring 27 is such that it will force shaft 23 inward or toward the left in respect to Figs. 3 and 4 and will thus keep the clutch members engaged so that rotary motion imparted to pulley 43 will be transmitted to spiral conveyor 16 and will rotate the same in a direction to spread the grain in the hopper from the inner point or point of delivery from the spout 15 toward the outer or remote end portion of the hopper and hence, of course, toward the remote end of the discharge passage 9 from the hopper. Attention has already been called to the fact that the arrangement described is such that when the running parts of the feed mechanism are at rest, the grain running from the spout 15 under the action of gravity, would not be distributed to the proper depth at the outer or remote end of the hopper and its discharge passage. In fact, any arrangement in which the grain would run completely to the remote or outer end of the feed hopper and without a commingling agitation of the grain, would be objectionable because it would allow the lighter and coarser materials, including oats, to be delivered from the discharge passage 9 chiefly at the remote or outer end portion thereof, whereas the commingled material should be kept well mixed up to the time that they are delivered to the scalper or other receiving device. The above objectional action is obviated and the entire structure is kept low down or close to the ground by the arrangement above described and illustrated in the drawings.

Under rotation of the spiral conveyor 16, the grain which has accumulated to considerable depth, to wit: to a depth far above the receiving portion of the conveyor will, by the conveyor, be spread out, kept thoroughly commingled and delivered to the remote or outer portion of the hopper, thereby keeping the feed passage 16 well covered so that there will be an even flow or discharge therefrom and the commingled grain will be delivered to the scalper in a spread out comparatively thin sheet of even depth or thickness. It is obvious that it will be impossible to continuosly run the conveyor 16 just at the right speed to always keep the feed passage 9 properly covered, and the fact that the discharge passage 9 will, at different times, be varied in the depth of its opening, makes the above suggested action further impossible. Hence the arrangement must be such that under continuous operation of the conveyor 16 there would be, after the conveyor is operated for a very short time, an over-accumulation of the grain at the remote or outer end of the hopper. This fact is taken advantage of and utilized by the clutch-controlling mechanism which, in its preferred arrangement, includes the spiral conveyor 25 and connections described.

The said conveyor 25 is located at such distance above the bottom of the hopper that, when the discharge passage 9 at the outer or remote end of the hopper is covered with grain, only to a desired extent, said conveyor 25 which, under rotation forces grain toward the fixed head 21, will not act with sufficient force, if with any force at all, against the spring 27 and hence the clutch members will then remain in engagement and the main or primary feed screw or conveyor 16 will be kept in operation and will continue the outward grain-spreading and commingling action. When, however, there is an over-accumulation of the grain at the remote or outer end of the hopper, the clutch-actuating conveyor 25 will be nearly or quite embedded in the grain and will then crowd the grain against the fixed head 21 with force, which, reacting on said conveyor, further compresses spring 27 and forces shaft 23 outward or toward the right in respect to Figs. 3 and 4 as far as permitted by a stop collar 23ª and moves pulley 33 laterally outward far enough to carry the clutch dogs 35 out of zone of action on the lugs 31 of half clutch 30. This disengagement of the clutch members, of course, temperarily stops rotation of the spiral conveyor 16 and said conveyor will remain idle until grain has been fed from the hopper to such an extent that the resistance due to crowding of grain by screw 25 against head 21 is no longer sufficient to overcome spring 27 and thereupon, said spring immediately causes the clutch members to be reengaged and the conveyor 16 to be again driven until it is again tripped out of action by another over-accumulation of grain. Preferably, the head 21 is made concave so that it will pocket some grain and thereby increase the thrusting action of the accumulated grain against the clutch-tripping screw or spiral 25.

What I claim is:

1. A feed receptacle having an elongated discharge passage in its lower portion, a spiral conveyor arranged over said discharge passage for the spreading and feeding of grain from the point of delivery to the remote portion of said discharge passage, a power-actuated drive for said spiral conveyor including a normally engaged clutch, a spiral rotary clutch-tripping device driven from said power-actuated drive and connected to one of the clutch members, said spiral rotary clutch-tripping device being relatively short as compared with said spiral conveyor, and located in said receptacle above that portion of said discharge passage that is remote from the point of delivery of said grain thereto and being arranged for endwise clutch-opening movement by resistance produced by an over-accumulation of grain above said discharge passage.

2. A feed receptacle having an elongated discharge passage in its lower portion, a supply spout arranged to deliver grain or the like into said receptacle to an extent less than to cover the remote portion of said discharge passage, a spiral conveyor arranged over said discharge passage for the spreading and feeding of grain from the point of delivery to the remote portion of said discharge passage, a power-actuated drive for said spiral conveyor including a normally engaged clutch, a sprial rotary clutch-tripping device driven from said power-actuated drive and connected to one of the clutch members, said spiral rotary clutch-tripping device being relatively short as compared with said spiral conveyor, and located in said receptacle above that portion of said discharge passage that is remote from the point of delivery of said grain thereto and being arranged for endwise clutch-opening movement by resistance produced by an over-accumulation of grain above said discharge passage.

3. A feed receptacle having an elongated discharge passage in its lower portion, a spiral conveyor arranged over said discharge passage for the spreading and feeding of grain from the point of delivery to the remote portion of said discharge passage, a power-actuated drive for said spiral conveyor including a clutch made up of a rotary driving clutch member and a rotary-axially movable driven clutch member, a spiral rotary clutch-tripping device continuously driven by said power device and connected to move axially with said driven clutch member, a yielding element acting on said clutch-tripping device to normally hold said clutch elements engaged for the driving of said spiral conveyor, and an abutment co-operating with said spiral clutch-tripping drive and co-operatively arranged so as to move the latter axially and thereby disengage said clutch members and temporarily disconnect said spiral conveyor from said drive, when there is an over-accumulation of grain at said remote portion of said discharge passage.

In testimony whereof I affix my signature.
JOHN J. VARUSKY.